(No Model.)
A. W. JACKSON.
HOSE COUPLING.
No. 495,890. Patented Apr. 18, 1893.
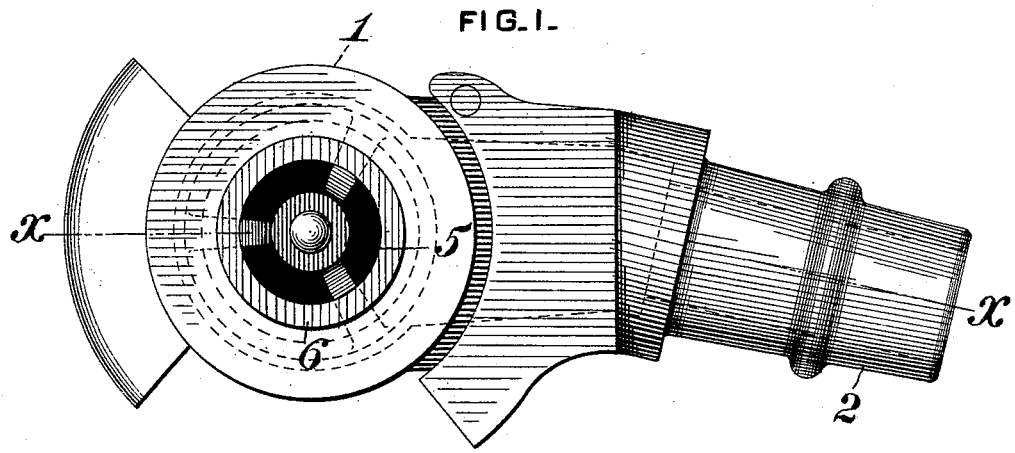
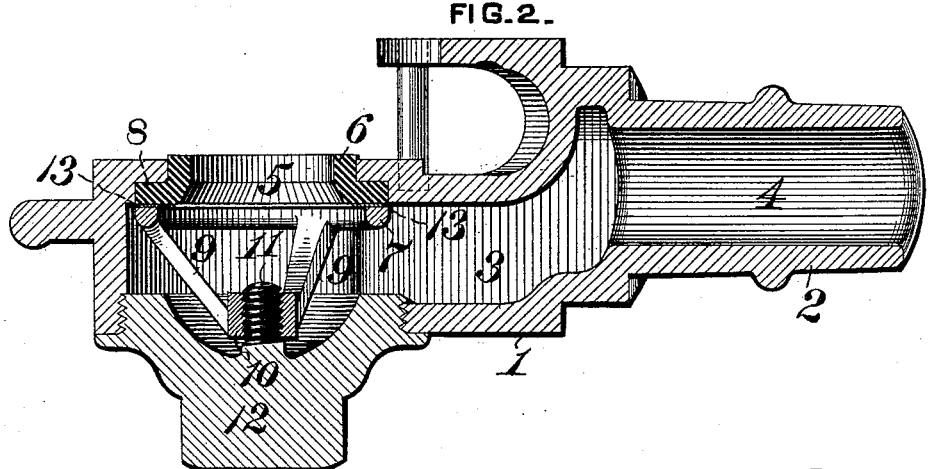
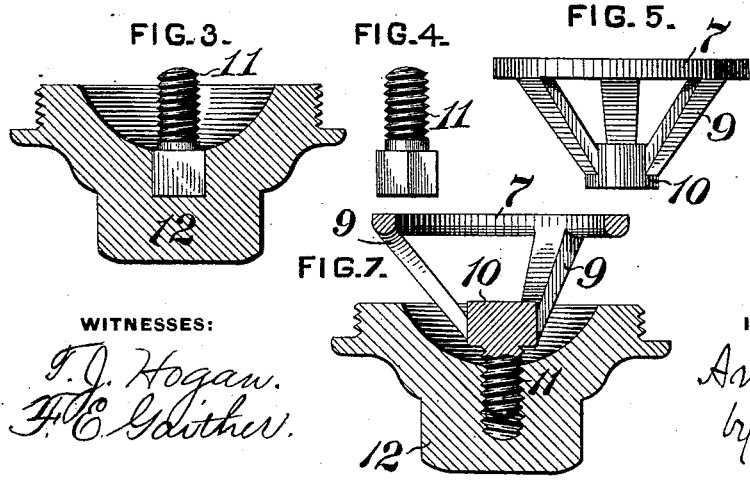
WITNESSES:
T. J. Hogan.
F. E. Gaither.
INVENTOR,
Amariah W. Jackson
by George H. Christy
Att'y.

UNITED STATES PATENT OFFICE.

AMARIAH W. JACKSON, OF CHICAGO, ILLINOIS, ASSIGNOR TO THE WESTINGHOUSE AIR BRAKE COMPANY, OF PITTSBURG, PENNSYLVANIA.

HOSE-COUPLING.

SPECIFICATION forming part of Letters Patent No. 495,890, dated April 18, 1893.

Application filed August 10, 1892. Serial No. 442,658. (No model.)

*To all whom it may concern:*

Be it known that I, AMARIAH W. JACKSON, a citizen of the United States, residing at Chicago, in the county of Cook and State of Illinois, have invented or discovered a certain new and useful Improvement in Hose-Couplings, of which improvement the following is a specification.

The object of my invention is to provide a detachable hose coupling which shall be simple in construction, and in which the gasket which forms, or packs, the joint between the two sections may be easily removed and replaced and secured in place through the opening in the face of the coupling and without necessarily removing the closing parts at the back of the coupling; and to this end my invention consists of an improved coupling in which the gasket is held in place by a compressor which is inserted through an opening in the back of the coupling, and which is adjustable toward or from the gasket by turning on an adjusting device formed on, secured to, or held by the closing piece or screw plug which permanently closes the opening in the back of the coupling shell, whereby the gasket may be removed or replaced and the compressor adjusted without breaking the joint at the back of the coupling or removing the closing piece or screw plug.

In the accompanying drawings, Figure 1 is an elevation of one of the sections of the coupling; Fig. 2, a longitudinal section through the same on the line *x, x,* of Fig. 1, showing the adjusting device, or screw, formed integral with the screw plug; Fig. 3, a modification of the construction of the screw plug and adjusting device; Fig. 4, another view of the adjusting screw shown in Fig. 3; Fig. 5, a side elevation of the compressor; Fig. 6, a plan view of the compressor; and Fig. 7, a section through the compressor and screw plug, showing another modification of the adjusting device.

The shell 1 is connected to the hose, or pipe, by means of the nozzle 2, and has formed in it the chamber 3 which communicates through the passage 4 in the nozzle 2 with the hose, or pipe, and through the opening 5 with a similar chamber in the other half or section of the coupling. A gasket 6 fits in the opening 5 and abuts against a similar gasket in the other section or half of the coupling, not shown, for making a tight joint between the two sections. The gasket is held in place by means of a compressor having a ring 7 which clamps the flange 8 of the gasket against that portion of the shell which surrounds the opening 5. The ring 7 of the compressor is connected by ribs 9 to a hub 10, which has a screw thread engaging a thread on the closing plug 12 whereby when the compressor is turned it may be moved either toward or away from the gasket.

As shown in Fig. 2, a female thread is formed on the hub 10 and engages a male thread on the projection 11, which is an integral part of the plug 12. The screw, or threaded projection 11, may be a separate piece around the head of which the plug 12 is cast; or, it may be a separate piece, the head of which fits in a recess in the plug 12 and is of suitable form to prevent it from turning. These constructions are illustrated in Figs. 3 and 4. In the modification shown in Fig. 7 the male screw is formed on the hub 10 and the female screw on the plug 12.

The ring 7 of the compressor may bear directly on the flange 8 of the gasket, but in order to avoid the friction between the compressor and the gasket, when the compressor is turned, I prefer to employ the ring 13 between the flange of the gasket and the ring 7 of the compressor.

In assembling the parts the compressor is first connected to the plug 12 by means of the screw threads; the gasket and the ring 13 are put in position, and the plug 12 is then screwed into the back of the coupling. The compressor may then be turned through the opening 5 so as to clamp the gasket in place. The parts are so proportioned that when the compressor is in the position in which it clamps the gasket, it may be turned back a sufficient distance to release the pressure on the gasket and leave space enough between the ring 7 and the wall of the coupling to permit the gasket to be easily removed and replaced through the opening 5.

It will be seen that with this construction the screw plug, after it is once put in place, need not be removed every time the gasket is to be examined or removed, but that the gasket may be removed and replaced as often as desirable, through the opening 5. But in case the compressor needs to be repaired or renewed, the plug 12 can then be removed and the compressor taken out and replaced, or a new one inserted. It will be seen that in this respect my device is a considerable improvement as compared with those constructions in which no provision is made for removing the compressor. My construction is also less difficult to make than those devices in which the back wall of the coupling is closed and forms an integral part of the casting, and in which the compressor is cast inside of the shell in such a way that it cannot be removed, or if it becomes broken renders the coupling useless. With my construction the seat of the flange 8 of the gasket is easily accessible for the purpose of making it a suitable bearing surface for the flange and thereby securing a tight joint.

What I claim as my invention, and desire to secure by Letters Patent, is—

In a detachable hose coupling, the combination with a half section, or shell, of the coupling, of an opening in the face of the coupling, a gasket in the opening, an opening in the back of the coupling having a screw plug, or closing piece for closing said opening, and a compressor adjustable to and from the gasket, by means of a screw-thread connection with the screw plug, or closing piece, substantially as set forth.

In testimony whereof I have hereunto set my hand.

AMARIAH W. JACKSON.

Witnesses:
 O. W. BOND,
 M. L. PRICE.